United States Patent [19]
White

[11] 3,775,072

[45]*Nov. 27, 1973

[54] GAS PRODUCTION

[75] Inventor: Robert J. White, Pinole, Calif.

[73] Assignee: Chevron Research Company, San Francisco, Calif.

[ * ] Notice: The portion of the term of this patent subsequent to Sept. 18, 1990, has been disclaimed.

[22] Filed: Dec. 14, 1970

[21] Appl. No.: 98,155

Related U.S. Application Data

[63] Continuation-in-part of Ser. No. 34,834, May 5, 1970.

[52] U.S. Cl. .................................. 48/209, 48/202
[51] Int. Cl. ............................................. C10j 3/00
[58] Field of Search ................ 48/209, 111, 197 A, 48/197 R, 202, 210; 23/212, 212 A; 201/21, 23, 25, 2.5

[56] References Cited
UNITED STATES PATENTS 3,317,292  5/1967  Juda ..................................... 48/209
1,773,959  8/1930  Crow ................................. 201/21 X
3,252,773  5/1966  Solomon et al. ................ 48/209 UX Primary Examiner—Joseph Scovronek
Attorney—George F. Magdeburger, Thomas G. De Jonghe, J. A. Buchanan and R. H. Davies

[57] ABSTRACT

A process for producing high BTU gas which comprises contacting an organic feed material, containing hydrogen and at least 10 weight percent oxygen, with steam in a reaction zone in the presence of an alkali metal catalyst at an elevated temperature and an elevated pressure of at least 50 psig. It is particularly preferred to carry out gasification of the organic material at a pressure above 300 psig. Particularly preferred catalysts are potassium compounds, most preferably potassium carbonate. Preferred reaction temperatures are between 1200 and 1400°F.

9 Claims, No Drawings

GAS PRODUCTION

CROSS REFERENCES

This application is a Continuation-in-Part of Application Ser. No. 34,834, filed May 5, 1970, entitled "Catalytic Hydrogen Manufacture," the disclosure of which application is incorporated by reference into the present patent application.

BACKGROUND OF THE INVENTION

The present invention relates to the gasification of hydrocarbonaceous material. More particularly the present invention relates to the gasification of organic material to obtain gases such as fuel gases, especially fuel gases rich in hydrogen. Various methods have been suggested for the production of hydrogen-rich gas mixtures. Among these methods are steam-hydrocarbon reforming and partial oxidation of hydrocarbons.

The gases produced by steam hydrocarbon reforming or partial oxidation can be converted to fuel gases, for example, by steps including hydrogenation of carbon monoxide to obtain a hydrogen-methane or hydrogen light hydrocarbon gas mixture. Examples of gasification of hydrocarbon materials to produce fuel gases are given in U.S. Pat. No. 3,531,267.

In typical steam reforming processes, hydrocarbon feed is pretreated to remove sulfur compounds which are poisons to the reforming catalyst. The desulfurized feed is mixed with steam and then is passed through tubes containing a nickel catalyst. While passing through the catalyst-filled tubes, most of the hydrocarbons react with steam to form hydrogen and carbon oxides. The tubes containing the catalyst are located in a reforming furnace, which furnace heats the reactants in the tubes to temperatures of 1200°–1700°F. Pressures maintained in the reforming furnace tubes range from atmospheric to 450 psig. If a secondary reforming furnace or reactor is employed, pressures used for reforming may be as high as 450 psig to 700 psig. In secondary reformer reactors, part of the hydrocarbons in the effluent from the primary reformer is burned with oxygen. Because of the added expense, secondary reformers are generally not used in pure hydrogen manufacture, but are used where it is desirable to obtain a mixture of $H_2$ and $N_2$, as in ammonia manufacture. The basic reactions in the steam reforming process are:

$C_nH_{2n+2} + nH_2O \rightleftarrows nCO + (2n+1)H_2$
$C_nH_{2n+2} + 2nH_2O \rightleftarrows nCO_2 + (3n+1)H_2$ e.g., methane-steam:

$CH_4 + H_2O \rightleftarrows CO + 3H_2$; and
$CH_4 + 2H_2O \rightleftarrows CO_2 + 4H_2$ In typical partial oxidation processes, a hydrocarbon is reacted with oxygen to yield hydrogen and carbon monoxide. Insufficient oxygen for complete combustion is used. The reaction may be carried out with gaseous hydrocarbons or liquid or solid hydrocarbons, for example, with methane, the reaction is:

$CH_4 + 1/2O_2 \rightleftarrows 2H_2 + CO$

With heavier hydrocarbons, the reaction may be represented as follows:

$C_7H_{12} + 2.8O_2 + 2.1 H_2O \rightleftarrows 6.3CO + .7CO_2 + 8.1H_2$

Both catalytic and noncatalytic partial oxidation processes are in use. Suitable operating conditions include temperatures from 2,000°F. up to about 3,200°F. and pressures up to about 12,000 psig, but generally pressures between 100 and 600 psig are used. Various specific partial oxidation processes are commercially available, such as the Shell Gasification Process, Fauser-Montecatini Process, and the Texaco Partial Oxidation Process.

There is substantial carbon monoxide in the hydrogen-rich gas generated by either reforming or partial oxidation. To convert the carbon monoxide to hydrogen and carbon dioxide, one or more CO shift conversion stages are typically employed. The CO shift conversion reaction is:

$CO + H_2O \rightarrow H_2 + CO_2$

This reaction is typically effected by passing the carbon monoxide and $H_2O$ over a catalyst such as iron oxide activated with chromium.

Production of hydrogen and other gases from waste substances produced in the manufacture of paper from wood chips and the like has been discussed in the literature as, for example, in U.S. Pat. No. 3,317,292. In the manufacture of paper, wood chips are digested, for example, with an aqueous calcium sulfide liquid thereby forming calcium lignin sulfonate waste product in solution, leaving wood pulp behind. As disclosed in U.S. Pat No. 3,317,292, the waste substances containing lignin-derived organic components can be converted to a gas mixture comprising hydrogen by contacting the waste material with steam in a reaction zone at an elevated temperature at least of the order of several hundred degrees centigrade. The sulfite waste liquor produced in the manufacture of paper from wood chips and the like is a relatively well-defined waste material consisting mostly of lignin-type organic compounds and certain inorganic components, including at least five weight percent sulfur calculated as the element sulfur but present usually in the form of sulfur compounds.

The use of catalysts such as potassium carbonate has been disclosed for the reaction of carbon with steam to form hydrogen as is discussed, for example, in Journal of the American Chemical Society, Vol. 43, p. 2055 (1921). However, the use of catalysts such as potassium carbonate to catalyze the reaction of organic material containing substantial amounts of oxygen, particularly waste or garbage-type material with steam to form hydrogen does not appear to be disclosed or suggested in the prior art.

U.S. Pat. No. 3,471,275 discloses a method for converting refuse or garbage-type material to gases such as gases rich in hydrogen. According to the process disclosed in U.S. Pat. No. 3,471,275, the refuse is fed to a retort and heated therein to a temperature between about 1,650°F. and 2,200°F. The retort is externally heated. According to the '275 patent process, steam is not generally added to the retort. Any steam which is added to the retort according to the process disclosed in the '275 patent is added to the bottom of the retort so that steam would flow counter-current to the waste material which is introduced to the retort at the top of the retort. No catalyst is used in the '275 patent process. The '275 patent discloses that the refuse can be converted gases obtained from the fuel gas by mixing the refuse gas with a base gas. The '275 patent also discloses that the amount of carbon monoxide produced in gasification of refuse will be rather low when the gasification temperature is fairly low. However, the temperatures preferred for the '275 process are relatively high temperatures, that is, above about 1650°F. as previously indicated.

SUMMARY OF INVENTION

According to the present invention a process is provided for producing high BTU gas which process comprises contacting an organic feed material, containing hydrogen and at least 10 weight percent oxygen, with steam in a reaction zone in the presence of an alkali metal catalyst at an elevated temperature and an elevated pressure of at least 50 psig.

The present invention is based, among other factors, on my finding of the unexpectedly fast alkali metal catalyzed reaction of steam with organic feedstock material containing at least 10 weight percent combined oxygen to form a hydrogen-rich gas, and also on my finding that a dramatic increase in the BTU content of the gas is obtained by carrying out the reaction at elevated pressures of at least about 50 psig.

Preferred pressure temperature and steam mole fractions for the gasification reaction in accordance with the present invention are 50 to 2,000 psig, 1000° to 1800°F. and 0.1 to 0.8 steam mole fraction. It is particularly preferred in the process of the present invention to use as feedstock organic material containing at least 20 weight percent oxygen, with 25 weight percent oxygen being even more preferred. It is to be understood that the oxygen referred to is chemically combined oxygen, that is oxygen chemically combined with the organic feedstock. Preferably the oxygen is chemically combined with carbon in the organic compound.

Particularly preferred operating pressures for the gasification reaction according to the present invention are between about 300 and 800 psig. Increasing the operating pressure in the gasification zone from about atmospheric to about 50 psig results in a considerable increase in the BTU content of the gasification product. However, increases in the chosen operating pressure in the range from about 50 to 300 psig has a particularly dramatic effect in increasing the BTU content of the product gas (probably due to the very rapid increase in the methane content of the product gas for higher pressures). Increases in the BTU content of the product gas from gasification is also considerable for higher pressures within the range of about 300 to 600 or 800 psig, but the increase in the BTU content of the product gas is not as steep a dependent direct function on operating pressure increases within this range as compared to the 50 to 300 psig range.

Particularly preferred operating temperatures for the gasification reaction are between 1200° and 1400°F. These temperatures are lower than the temperatures used, for example in the U.S. Pat. No. 3,471,275 process for the gasification of refuse and lower than partial oxidation gasification temperatures (1800° to 3200°F.) and lower than steam hydrocarbon reforming temperatures (about 1800°F.). In the process of the present invention the operating temperature is particularly important in combination with the use of the alkali metal catalyst. The catalyst and temperature inter-cooperate in that without the catalyst the main gasification reaction (reaction (1) below) is not fast enough to be commercially attractive at low temperatures, for example, temperatures below 1500°F., and particularly temperatures below 1400°F. Temperatures below 1400°F. are particularly preferred in the process of the present invention as they help in achieving a high BTU product gas. Using the alkali metal catalyst in accordance with the present invention results in the reaction rate of the oxygen containing organic feedstock with steam being fast enough to be commercially attractive even at temperatures below 1400°F.

I also have found that the gasification operating temperature is preferably greater than about 1100°F. to keep the pressurized gasification reaction rate reasonably fast in the process of the present invention. There are two primary reactions involved in the gasification:

$$C_6H_{12}O_6 + H_2O \rightarrow 2H_2 + CO_2 \quad (1)$$

$$(C_xH_xO_x)$$
$$CO_2 + 4H_2 \rightarrow CH_4 + 2H_2O \quad (2)$$

In the above reactions $C_6H_{12}O_6$ is used as an exemplary oxygen-containing organic feedstock and $C_xH_xO_x$ is used to indicate that various other oxygen containing organic feedstocks could be used under substantially similar reaction conditions.

For the above reactions, reaction (1) is considerably faster, that is, the reaction kinetics are considerably faster, in the presence of an alkali metal catalyst, particularly potassium carbonate, at temperatures such as used in the process of the present invention. Reaction (1) is also faster, that is, the reaction kinetics for reaction (1) are faster at higher temperatures. But reaction (2) is favored equilibrium-wise toward the right by lower temperature. Reaction (2) is an important reaction to favor in the process of the present invention because methane has a BTU content approximately three times larger than the BTU content of hydrogen per cubic foot. We have found that temperatures between about 1200° and 1400°F. are particularly advantageous from the standpoint of a relatively fast reaction for reaction (1) in the presence of the alkali metal catalyst, but yet still attractive for reasonably favorable equilibrium to the right for reaction (2), particularly using a gasification pressure above 50 psig and more preferably above 300 psig.

For the inter-related reasons given above, factors such as the oxygen content of the feedstock, the catalyst and the temperature and the pressure are important in the gasification process of the present invention. The mole fraction of steam present in the gasification zone in the process of the present invention is also an important factor. In addition to the two reactions given above, a third important reaction is:

$$CO + H_2O \rightarrow H_2 + CO_2 \quad (3)$$

Higher amounts of $H_2O$ are desirable to shift reaction (3) towards the right because lower amounts of carbon monoxide are desired in the product gas from the gasification zone. Higher amounts of $H_2O$ also aid reaction (1) in the production of $H_2$. However, steam mole fractions too high cut down on the $CH_4$ product obtained in accordance with reaction (2). We have found that within the reaction system of the present invention, preferably the steam mole fraction is between about 0.35 and 0.65 to obtain a relatively high BTU content product gas from the gasification zone as well as a fairly fast reaction rate in the gasification zone. Particularly preferred mole fractions for the steam in the gasification zone are about 0.5, for example between about 0.45 and 0.55. These mole fractions can be calculated based on steam partial pressure in the gasification zone.

The oxygen and the hydrogen content in the organic feed material to the gasification zone are to be understood as chemically combined oxygen and hydrogen, i.e., oxygen and hydrogen which is connected through one or more chemical bonds to the carbon present in the organic feed material.

The catalyst used in the process of the present invention is preferably an alkali metal catalyst, as we have found particularly high reaction rates using alkali metal catalysts. Potassium carbonate has been found to be particularly preferable among the alkali metal catalysts. Other catalysts comprising Group VIII metals such as nickel can be used in the process of the present invention, but nickel catalysts have been found to be relatively susceptible to sulfur poisoning even at relatively low sulfur contents for the organic feedstock to the process of the present invention. Nickel catalysts are not soluble in water and thus cannot be readily recovered from the ash product from the reaction zone for reuse as a catalyst such as can be done with the alkali metal catalyst like potassium carbonate. Thus, although we have recently found that nickel catalysts such as nickel acetate, i.e. $Ni(Ac)_2$, and nickel nitrate, i.e. $Ni(NO_3)_2$, result in a very high reaction rate for hydrogen production from oxygen containing organic feedstocks at temperatures between about 1,200° and 1,400°F. Alkali metal catalysts, such as the potassium carbonate catalysts are preferred because of their very low susceptibility to sulfur poisoning and because of their recoverability, for example, by removing them from gasification zone ash by dissolving them in water.

The alkali metal catalysts include lithium, sodium, potassium, rubidium and cesium. Preferably, the alkali metal is added to the reaction zone by contacting the feed to the reaction zone with a solution of a salt of the alkali metal catalyst. The salts of the alkali metal catalyst include salts such as sulfates and chlorides. Although it is preferred to add the alkali metal catalyst to the reaction zone in the form of a carbonate, it is suitable to add the catalyst in other forms such as hydroxides or acetates, formates, sulfates, chlorides, or other alkali metal salts. It is believed these compounds will tend to be converted to carbonates in the reaction zone.

We have found that particularly suitable organic feed material for the process of the present invention includes lignite, wood, amd solid waste material, including material commonly referred to as garbage and sewage sludge. The term "solid waste material" or "solid waste" is used herein to include solid municipal waste or common garbage, sewage, industrial waste such as sawdust, and agricultural waste such as corn husks and other discarded cellulosic material.

According to a particularly preferred embodiment of the present invention, the feed material is solid municipal waste including what is commonly referred to as garbage, and also dried sewage. Solid municipal waste, consisting primarily of common garbage, is particularly preferred in that we have found that with simulated solid municipal waste, high conversion rates to high BTU gas can be obtained in the process of the present invention and also sanitary valuable products are produced to alleviate an important disposal and pollution problem resulting from the increasing amounts of solid municipal waste which must be disposed of daily.

In both the case of solid waste materials and other organic feed material satisfying the requirements of the present invention, preferred amounts of the catalyst as a weight percentage of the organic feed material are from one to 50 weight percent and particularly preferred amounts are from five to 20 weight percent.

When using the particularly preferred potassium carbonate catalyst, about two to 15 weight percent potassium carbonate is preferably impregnated into the feed before contacting the feed with steam in the reaction zone.

In the process of the present invention, it is preferred to add an oxygen-containing gas such as air or molecular oxygen to the reaction zone to burn a portion of the organic feed material with steam to form synthesis gas and carbon oxides. The heat for the reaction can also be supplied by heating the steam fed to the reaction zone to a sufficiently high temperature to supply the required amount of heat for the endothermic reaction of steam plus organic material to form synthesis gas.

Preferred organic feed material for the process of the present invention is organic material which is solid at room temperature and pressure; that is, solid or at least partially solid at about 70°F. and one atmosphere pressure.

As indicated previously, the organic feed material to the process present of the invention must contain a minimum amount of oxygen, namely at least 10 weight percent oxygen. Particularly preferred feedstocks contain 25 percent or more combined oxygen. As indicated in my pending application Serial No. 34,834, the reason for the fast reaction rate for the formation of hydrogen-rich gas in the catalytic reaction according to the process of the present invention is not completely understood, but the oxygen content of the feedstock has been found to be a related factor to the fast reaction when using the alkali metal catalyst. Furthermore, progressively higher oxygen contents, particularly from 10 to 25 weight percent, have been found to result in progressively faster reaction rates for the formation of hydrogen-rich gas in the process of the present invention.

It is important in the process of the present invention that the feed material contain less than five weight percent sulfur. The sulfur is calculated as the element sulfur, although for those undesired and excluded feedstocks, the sulfur is usually present as a compound as, for example, an organic sulfur compound or an inorganic sulfur compound present in the feed material. Thus, it is to be understood that the organic feed material contacted with steam according to the process of the present invention is free from a high percentage of inorganic or organic sulfur compounds, i.e., that the feed contains less than five weight percent sulfur either as sulfur chemically combined with the organic feed material or as inorganic sulfur compounds physically mixed with the organic feed material. Feeds such as Kraft black liquor produced as a waste material in the manufacture of paper pulp are not suitable in the process of the present invention because of the relatively high content of sulfur compounds in the Kraft black liquor. It is undesirable to have substantial amounts of sulfur feed to the reaction zone in the process of the present invention because of the increased reactor cost and, more particularly, because of the increased problems in removing sulfur compounds from the synthesis gas produced in the reactor. It is preferred that the sulfur content of the organic feed material be below about 3 weight percent sulfur.

EXAMPLE

Twenty-five grams of lignite were processed at one atmosphere and also at 40 atmosphere pressure in accordance with the process of the present invention. As shown from Table I below, a dramatic increase in the BTU content of the product gas from the gasification of the lignite was obtained when the pressure was increased from one atmosphere to 40 atmospheres. The BTU content of the gas was about 262 BTU's per cubic foot when the gasification was carried out at one atmosphere and 337 BTU's per cubic foot when the gasification was carried out at 40 atmospheres for an increase of about 25 percent in the BTU content. On a $CO_2$-free basis the BTU content was increased from 343 to 508 BTU's per cubic foot for an increase of over 77 percent.

The reaction conditions were as follows:
Lignite charged to reactor,
Reactor heated in an electric furnace to 1200°F.,
Steam added at rate of 24 grams per hour,
 For the one atmosphere run the steam was passed through the reactor at atmosphere pressure and gas product was withdrawn.
 For the 40 atmospheric run the steam and gas products were kept in the reactor until the pressure built up to 40 atmospheres (about 15 min.). The pressure was kept at about 40 atmosphere while gas product was withdrawn.

In both the one atmosphere run and the 40 atmosphere runs the gas product from the reactor was passed through a condenser to condense oil and water. Gas from the condensing step was passed to a wet test meter to measure the amount of gas product produced. Periodically samples of the gas were withdrawn into separate containers so that the samples of gas could be analyzed by mass spectrometry. The BTU content for the gas produced was calculated on the basis of the analyses as determined by mass spectrometry.

The composition of the lignite feed to the reactor was as follows on a dry basis:

Weight percent
| | |
|---|---|
| carbon | 64.9 |
| oxygen | 25.2 |
| hydrogen | 4.8 |
| sulfur | about 0.6 |
| ash | 7.15 (some carbon, oxygen, and sulfur is included in the weight percent ash) |

The weight percent volatiles in the lignite was 30 to 35.

TABLE I

| | | | Heat of Combustion, BTU/Ft.³ |
|---|---|---|---|
| Total Pressure, Atm. | 1 | 40 | |
| H₂O Rate, ml/Hr | 24 | 24 | |
| Gas Production Rate, L/Hr | 12 | 8 | |
| Gas Volume, L | 87 | 55 | |
| Gas Composition, Vol. % | | | |
| Methane | 2.1 | 14.6 | 1000 |
| Ethane-Pentane | 0.2 | 1.1 | 2500 |
| Carbon Monoxide | 1.7 | 3.2 | 320 |
| Carbon Dioxide | 23.7 | 33.6 | 0 |
| Hydrogen | 72.3 | 47.6 | 320 |
| Heat of Combustion of product gas, BTU/ft³, on an H₂O-free basis | 262 | 337 | |
| on an H₂O-and CO₂-free basis | 343 | 508 | |

The gas composition shown in Table I includes carbon monoxide. However, it is to be understood that Table I is indicative only of the raw gas obtained from the gasification zone operated in accordance with present invention. Purification steps, as indicated for example, in my co-pending application Ser. No. 34,834, are typically used at least in part in obtaining the product high BTU gas. Thus, in most instances some hydrogenation step such as shift conversion and/or methanation will usually be applied to the gasification zone gas product to convert carbon monoxide into hydrogen and/or methane. The amount of carbon dioxide removal can be varied if desired to vary the BTU content of the product gas.

Although various embodiments of the invention have been described, it is to be understood that they are meant to be illustrative only and not limiting. Certain features may be changed without departing from the spirit or scope of the invention. It is apparent that the present invention has broad application to the production of fuel gas from certain oxygenated organic feed material by reaction of the organic feed material with steam in the presence of a catalyst at an elevated pressure. Accordingly, the invention is not to be construed as limited to the specific embodiments or examples discussed but only as defined in the appended claims or substantial equivalents thereto.

I claim:
1. A process for producing a gas from an organic feed, which comprises obtaining a high-Btu gas by impregnating said feed with a catalyst and reacting the feed with steam by introducing the feed and steam into a reaction zone and contacting said feed with the steam at a temperature in the range from about 1000°F. to 1800°F. and at a pressure in the range from about 50 to 2000 psig, said feed containing hydrogen, having an oxygen content of at least 10 weight percent, and contaning less than five weight percent of sulfur, said catalyst being selected from the group consisting of alkali metal carbonates, hydroxides, acetates, formates, sulfate and chlorides, and said feed containing an amount of the catalyst based upon the feed in the range from about 1 to 50 weight percent.

2. The process as in claim 1 wherein the pressure is at least 300 psig.

3. The process as in claim 1 wherein sufficient steam is added to the reaction zone to maintain a steam mol fraction between 0.1 and 0.8 in the reaction zone.

4. The process as in claim 1 wherein the pressure is between 300 and 800 psig, the temperature is between about 1200° and 1400°F., sufficient steam is added to maintain a mol fraction of steam in the reaction zone in the range between about 0.1 and 0.8, and the amount of the catalyst is in the range from 5 to 20 weight percent.

5. The process as in claim 4 wherein the steam mol fraction is in the range 0.35 to 0.65.

6. The process as in claim 1 wherein the pressure is between 300 and 800 psig, the temperature is between about 1200° and 1400°F., sufficient steam is added to maintain a mol fraction of steam in the reaction zone in the range between about 0.1 and 0.8, the catalyst is potassium carbonate and the amount of catalyst is in the range from 2 to 15 weight percent.

7. The process as in claim 1 wherein the oxygen content of the organic feed is at least 20 weight percent.

8. The process as in claim 1 wherein the organic feed is solid at room temperature and pressure.

9. The process as in claim 1 wherein the organic feed is selected from the group consisting of lignite, wood, solid municipal waste, sewage sludge, industrial waste, and agricultural waste.

* * * * *